(12) United States Patent
Kado et al.

(10) Patent No.: US 6,915,631 B2
(45) Date of Patent: Jul. 12, 2005

(54) FORWARD/BACKWARD SWITCHING CONTROL APPARATUS FOR HYDRAULIC DRIVE VEHICLE, AND CONTROL METHOD THEREFOR

(75) Inventors: Hideki Kado, Oyama (JP); Yuuichi Yamamoto, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/611,967

(22) Filed: Jul. 3, 2003

(65) Prior Publication Data

US 2004/0003590 A1 Jan. 8, 2004

(30) Foreign Application Priority Data

Jul. 5, 2002  (JP) ...................................... 2002-196956

(51) Int. Cl.[7] .............................................. F16D 1/00
(52) U.S. Cl. ............................. 60/394; 60/399; 60/423; 60/465; 60/490
(58) Field of Search .......................... 60/399, 431, 394, 60/423, 449, 465, 469, 490

(56) References Cited

U.S. PATENT DOCUMENTS 4,075,841 A * 2/1978 Hamma et al. ............... 60/449
4,188,789 A * 2/1980 Hamma ........................ 60/494
4,355,509 A * 10/1982 Fulkerson et al. ............. 60/449
5,184,466 A * 2/1993 Schniederjan et al. ........ 60/449
6,385,970 B1 * 5/2002 Kuras et al. ................... 60/449

FOREIGN PATENT DOCUMENTS

JP         11182674        6/1999

* cited by examiner

Primary Examiner—Edward K. Look
(74) Attorney, Agent, or Firm—Varndell & Varndell, PLLC (57) ABSTRACT

A forward/backward switching control apparatus for a hydraulic drive vehicle that includes the following structures. A variable displacement type hydraulic pump driven by an engine for discharging pressure oil in both directions. An electromagnetic pump inclination angle control mechanism making the discharge displacement of the variable displacement type hydraulic pump variable and for causing the same to discharge in both directions. An electric control outputting signals to run the hydraulic drive vehicle forward, backward and forward/backward. A control device outputting, when the electric control is switched forward/backward to output the forward/backward signal and when the time for switching the forward/backward signal is not longer than a preset time, a first modulate signal for delaying the return times from the forward position to the neutral position and from the backward position to the neutral position to the electromagnetic pump inclination angle control mechanism.

11 Claims, 6 Drawing Sheets

FIG. 8

FORWARD/BACKWARD SWITCHING CONTROL APPARATUS FOR HYDRAULIC DRIVE VEHICLE, AND CONTROL METHOD THEREFOR

BACKGROUND OF THE INVENTION

1. Field of the Invention

The present invention relates to a forward/backward switching control apparatus for a hydraulic drive vehicle and a control method therefor and, more particularly, to a forward/backward switching control apparatus for a hydraulic drive vehicle, which is suited for a hydraulic drive vehicle to work while running, and a control method therefor.

2. Description of the Related Art

In the hydraulic drive vehicle, there has been generally used a construction, in which a variable displacement type hydraulic pump and a variable displacement type hydraulic motor or a fixed displacement type hydraulic motor are configured in a closed circuit.

Especially, the tire type hydraulic drive vehicle uses the variable displacement type hydraulic pump and the variable displacement type hydraulic motor to improve its controllability and runnability and so on. In order to prevent shocks and cavitations at the stopping time or at the turning time, it is the current practice that the tire type hydraulic drive vehicle is equipped with a safety valve and that the charge pressure is fed to the closed circuit.

In recent years, there has been used in a working vehicle or the like a forward/backward switching control apparatus which can be switched from forward to backward or from backward to forward, while the vehicle is running, directly by a control lever. This forward/backward switching control apparatus was proposed in JP-A-11-182674 by the Inventors.

When the hydraulic drive vehicle runs forward, for example, according to that Japanese Patent Application, the discharge oil of a variable displacement type hydraulic pump is fed through the forward position of a direction control valve from a first main circuit to one port of a variable displacement type hydraulic motor, and the discharge oil from the other port of the hydraulic motor is returned from a second main circuit through the forward position of the direction control valve to a tank, so that the hydraulic motor is driven forward.

The direction control valve is a three-position switching valve having a neutral position, and there is interposed between the direction control valve and the tank a back pressure valve for throttling the return oil from the direction control valve to apply a back pressure to the return oil. The direction control valve is switched in response to a pilot pressure oil coming from a direction changing electromagnetic valve to be activated by a command of a controller, to feed a pressure oil of the variable displacement hydraulic pump to the variable displacement type hydraulic motor thereby to run the hydraulic drive vehicle.

The forward/backward switching control apparatus comprises: a vehicle speed sensor for detecting a vehicle speed; a timer for inputting a vehicle speed signal to delay the duration for a controller to input a switching command and to output a switching control signal, by a preset time in accordance with the vehicle speed; a back pressure correction control valve for inputting a motor back pressure correction command from the controller to lower a control oil pressure for controlling the back pressure valve, thereby to correct the back pressure to rise; and an electromagnetic reducing valve for inputting a motor displacement correction command from the controller, to raise a motor displacement control oil pressure for controlling a motor discharge displacement control valve thereby to make such a correction that the discharge displacement of the motor, as might otherwise become the maximum, may be lowered to an arbitrary discharge displacement.

In the aforementioned construction, the controller holds the neutral position for a preset time and then outputs the switching control signal for switching the neutral position to forward or backward, to a direction switching electromagnetic valve.

In this forward/backward switching control apparatus, a pump displacement control valve receives a pump displacement control pressure from the electromagnetic reducing valve to increase the pump discharge displacement. At a deceleration, therefore, the hydraulic motor can be supplied with the increased discharge oil of the hydraulic pump to prevent the cavitation reliably.

When the speed is decelerated to a preset value or lower, the rotation speed of the hydraulic motor is lowered to reduce the supply needed. Therefore, the back pressure valve is returned to lower the back pressure of the return oil to be returned to the tank, thereby to reduce the back pressure loss. When the direction is smoothly switched from neutral to forward or from neutral to backward by increasing the discharge displacement of the hydraulic motor for the deceleration, moreover, the switching shock is reduced.

As a result, the forward/backward switching control apparatus is enabled to perform the forward/backward switching during the running smoothly without any speed changing shock merely by adding the aforementioned construction simply to the construction of the prior art. It is also described that the back pressure is minimized to improve the running efficiency in the running state other than deceleration and that the cavitation of the hydraulic motor can be reliably prevented in the deceleration.

SUMMARY OF THE INVENTION

In the forward/backward switching control apparatus of the Japanese Patent Application, however, the forward/backward switching is performed by switching the direction switching electromagnetic valve in response to the command from the controller thereby to build up the pilot pressure and by switching the direction control valve with that pilot pressure thereby to feed the pressure oil of the hydraulic pump to the forward port or backward port of the hydraulic motor. Simultaneously with this, the pilot pressure is fed from the direction switching electromagnetic valve to the pump displacement control valve to switch the pump displacement control valve thereby to increase/decrease the discharge displacement of the hydraulic pump.

Moreover, the pump displacement control valve receives the pump displacement control pressure from the electromagnetic reducing valve to increase the pump discharge displacement thereby to prevent the cavitation. The switching shock is switched, when the vehicle speed detected by the vehicle speed sensor is not higher than a preset value, to prevent the speed changing shock.

Thus, the forward/backward switching control apparatus uses the direction control valve, the direction switching electromagnetic valve, the pump displacement control valve, the electromagnetic reducing valve, the back pressure valve, the back pressure correction control valve, the vehicle speed sensor and so on so as to switch the forward and backward runs, to prevent the cavitation and to prevent the speed changing shock. Therefore, the number of control units increased to complicate the construction and control of the apparatus and to raise the cost.

The hydraulic drive vehicle is desired to switch the forward and backward runs slowly when the forward/backward switching operation is slowly done, to stop and start without any shock as in the prior art when the forward/backward switching operation is quickly done, and to do the switching as quickly as possible without any breakage of the hydraulic units.

On the other hand, the working vehicle frequently performs the forward/backward switching operation while causing its working equipment to work while it is running. For this, the hydraulic drive vehicle is desired: to run the engine at a high speed thereby to increase the discharge of the working hydraulic pump and cause the working equipment to work efficiently and quickly; and to have excellent workability and runnability while changing the speed with a comfortable feeling without any forward/backward switching shock even if the engine rotates at a high speed.

The present invention has been conceived in view of the above-specified problems and has an object to provide a forward/backward switching control apparatus for a hydraulic drive vehicle, which is freed from the speed changing shock or the cavitation by a simple construction and which can switch the forward and backward runs with a comfortable feeling even when the engine rotates at a high speed on the hydraulic drive vehicle having a working equipment mounted thereon.

In order to achieve the above-specified object, according to the invention, there is provided a forward/backward switching control apparatus for a hydraulic drive vehicle, comprising: a variable displacement type hydraulic pump driven by an engine for discharging pressure oil selectively in two directions; an electromagnetic pump inclination angle control mechanism for making the discharge displacement of the variable displacement type hydraulic pump variable and for causing the same to discharge selectively in the two directions; electric operating means for outputting signals to run the hydraulic drive vehicle forward or backward; and control means for outputting, when the electric operating means is switched either from the forward position through the neutral position to the backward position or from the backward position through the neutral position to the forward position to output the forward signal or the backward signal and when the time for switching to the forward signal or the backward signal is not longer than a preset time, a first modulate signal for delaying the return times from the forward position to the neutral position and from the backward position to the neutral position, to the electromagnetic pump inclination angle control mechanism.

In this case, the forward/backward switching control apparatus may further comprise control means for outputting the return time by the first modulate signal variably in accordance with an engine rotation speed.

Moreover, the forward/backward switching control apparatus may further comprise control means for outputting a second modulate signal to delay the time for going from the neutral position to the forward position or from the neutral position to the backward position, to the electromagnetic pump inclination angle control mechanism.

Moreover, the forward/backward switching control apparatus may further comprise control means for outputting a third modulate signal to delay longer for the lower engine rotation speed, when the engine rotation speed is not higher than a preset rotation speed.

Moreover, the forward/backward switching control apparatus may further comprise control means for interrupting the first modulate signal of the return time and outputting the second modulate signal of the going time, when the engine rotation speed changes from low to high.

According to the above-specified constructions, the hydraulic drive vehicle outputs, when the electric operating means is controlled in the forward or backward direction, the control signal to the control means. In accordance with the control signal, the control means strokes the electromagnetic pump inclination angle control mechanism to feed the pressure oil from the variable displacement type hydraulic pump to the variable displacement type hydraulic motor thereby to run the hydraulic drive vehicle forward or backward.

When the electric operating means is operated to the forward position, for example, the hydraulic drive vehicle runs forward such that the variable displacement type hydraulic pump discharges the pressure oil forward according to the control of the electric operating means. When the running direction is to be changed, the electric operating means is subjected to the forward/backward control so that it is switched from the forward position to the backward position. As a result, the hydraulic drive vehicle is decelerated in its forward run and then stopped, and is accelerated in its backward direction so that its running direction is changed.

At this time, the control means receives the forward/backward signal from the electric operating means. When the time for switching the forward/backward signal is not longer than the preset time, the control means outputs the first modulate signal for delaying the return time from the forward position to the neutral position or from the backward position to the neutral position, to the electromagnetic pump inclination angle control mechanism.

Even if the electric operating means is quickly operated forward/backward, therefore, the control means the delayed first modulate signal to the electromagnetic pump inclination angle control mechanism. Therefore, the discharge oil of the variable displacement type hydraulic pump is slowly decreased so that the hydraulic drive vehicle is gradually decreased to stop. The forward switching control device is controlled in deceleration by the modulate signal of the control means so that it can reduce the forward/backward switching shock with the simple construction. Moreover, the hydraulic drive vehicle can select the modulate signal suitably according to the forward/backward switching control rate, and the forward/backward switching can be done according to the control of the operator. Moreover, the hydraulic drive vehicle is slowly decelerated so that it can prevent the cavitation from occurring.

In response to the rotation speed of the engine, the control means makes the return time of the first modulate signal long for the high rotation and short for the low rotation. Therefore, the deceleration shock of the hydraulic drive vehicle is eliminated, and the pressure oil can be sufficiently fed to the variable displacement type hydraulic motor to prevent the occurrence of the cavitation.

The control means outputs the second modulate signal for delaying the going time from the neutral position to the forward position and from the neutral position to the backward position, to the electromagnetic pump inclination angle control mechanism. Therefore, the discharge oil of the variable displacement type hydraulic pump is increased according to the signal so that the hydraulic drive vehicle is gradually accelerated to a constant speed. As a result, the forward/backward switching control apparatus is controlled in acceleration with the modulate signal of the control means so that the forward/backward switching shock can be reduced with the simple construction to establish a preset acceleration.

When the engine rotation speed is not higher than the preset rotation speed, the control means outputs the longer third modulate signal for the lower engine rotation speed. Even if the engine rotation speed becomes lower to reduce the discharge of the variable displacement type hydraulic pump, therefore, the third modulate signal is elongated to elongate the feed time of the pressure oil so that the cavitation can be prevented from occurring.

When the engine rotation speed changes from low to high values, the control means interrupts the first modulate signal of the return time Ta and outputs the second modulate signal of the going time. Therefore, the forward/backward switching is quickened so that the hydraulic drive vehicle can switch the forward and backward runs quickly in response to the accelerator control of the operator. Moreover, the running direction can be quickly changed to improve the safety.

BRIEF DESCRIPTION OF THE DRAWINGS

FIG. 5A and FIG. 5B showing relations between an engine rotation speed and a modulate signal.

DESCRIPTION OF THE PREFERRED EMBODIMENT

An embodiment of the forward/backward switching control apparatus for a hydraulic drive vehicle according to the invention will be described with reference to the accompanying drawings.

Figure 1:
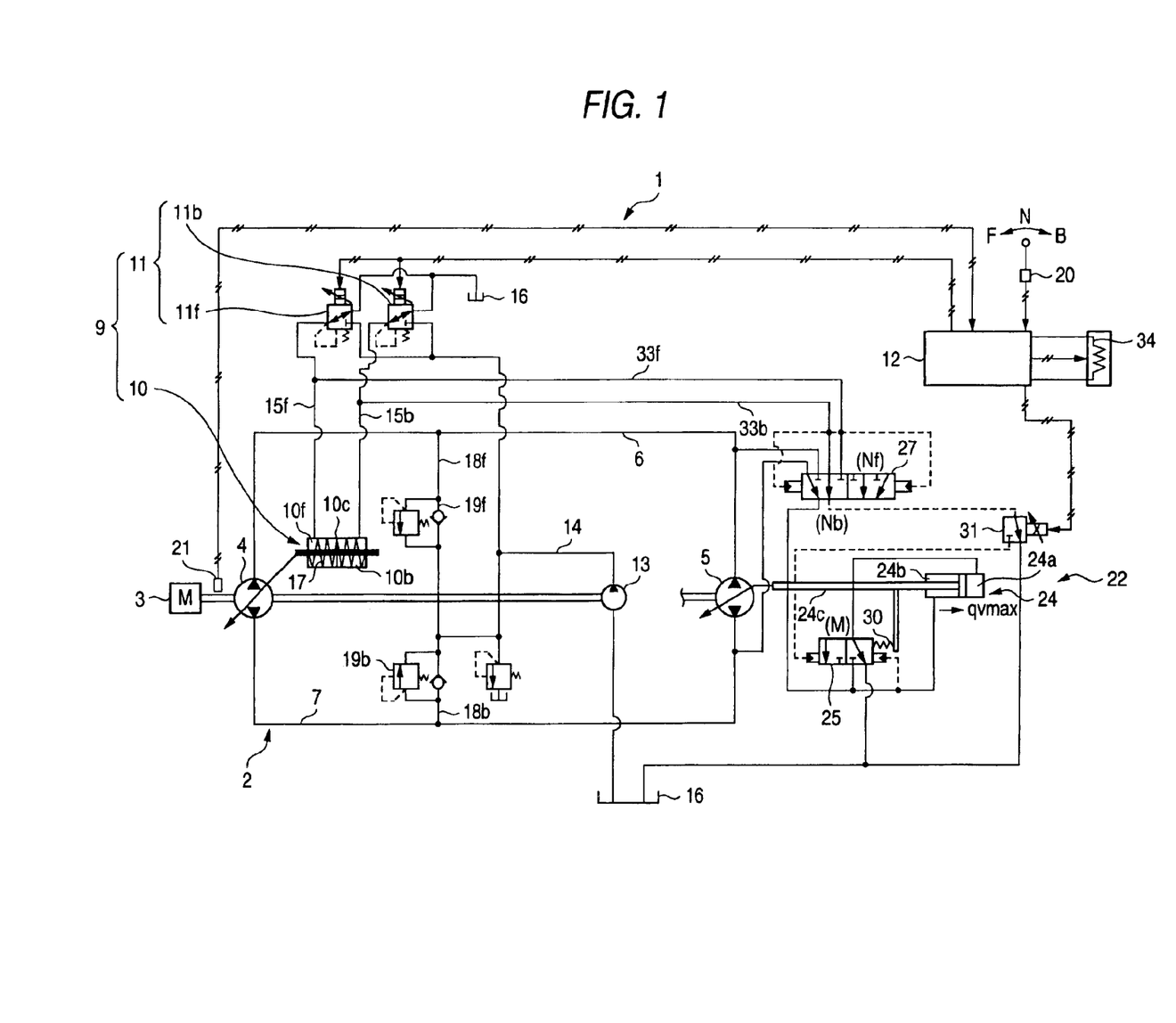
FIG. 1 is a circuit diagram of a forward/backward switching control apparatus for a hydraulic drive vehicle according to the invention.
Figure 2:
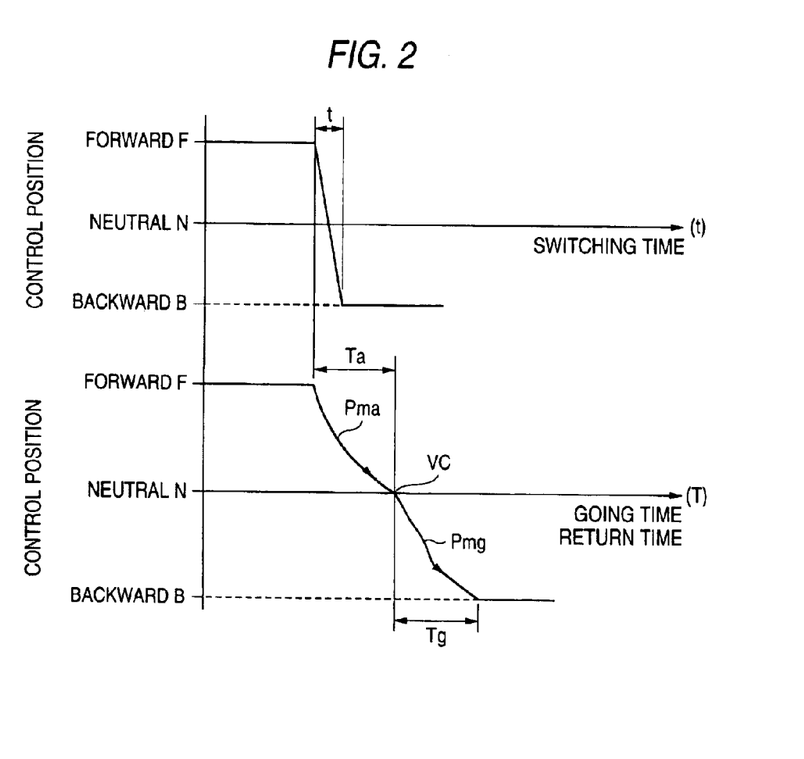
FIG. 2 is a diagram showing one example of a forward/backward switching time and a modulate signal to be outputted from a control unit to an electromagnetic proportioning valve.
Figure 3A:
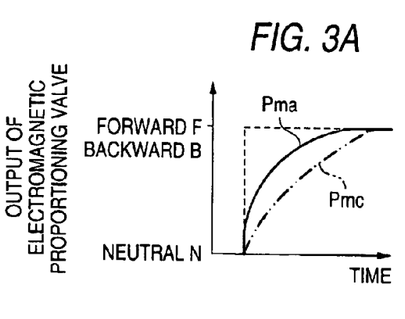
FIG. 3A to FIG. 3C are diagrams showing other examples of the modulate signal to be outputted from the control unit to the electromagnetic proportioning valve.
Figure 3B:
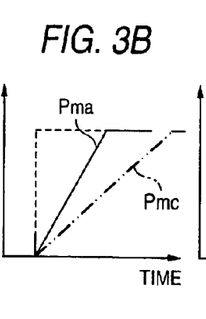
Figure 3C:
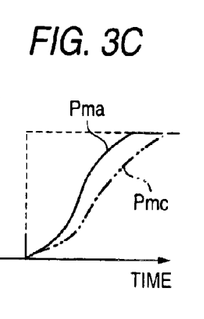
Figure 4:
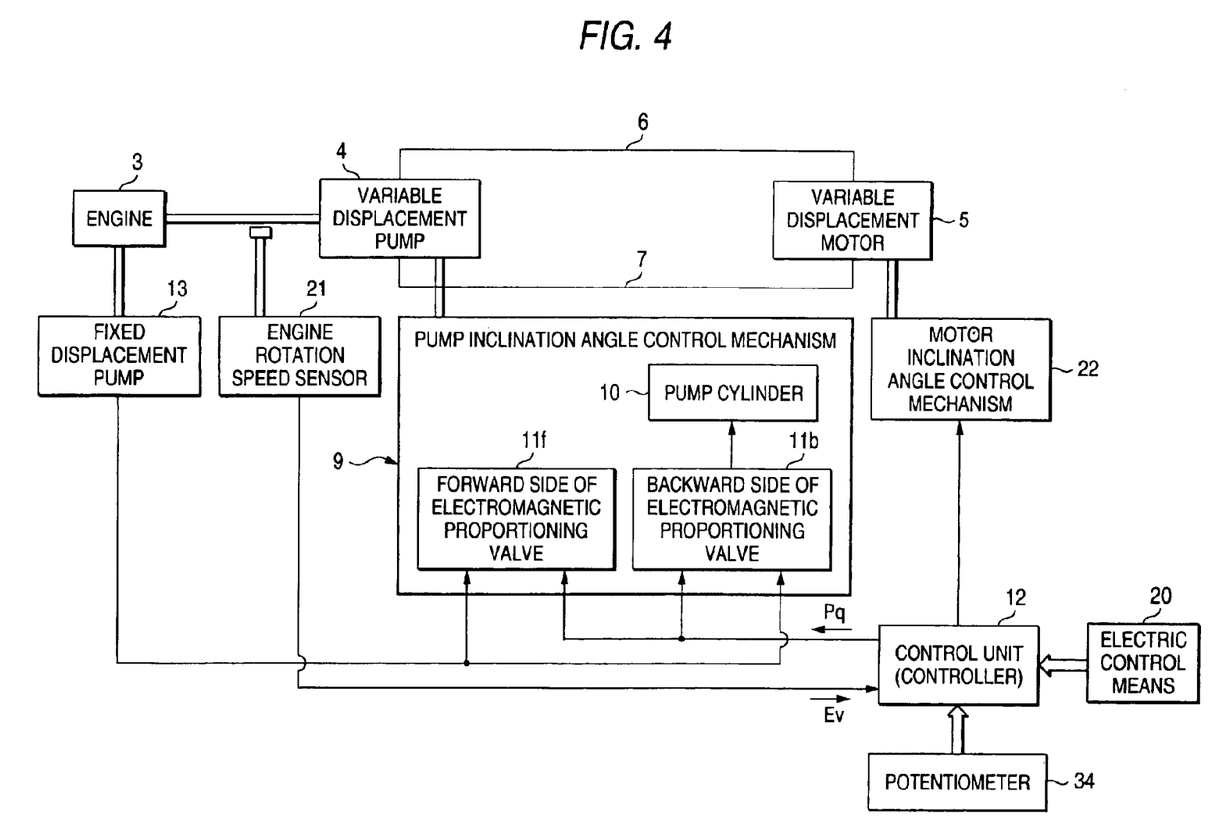
FIG. 4 is a block diagram of a forward/backward switching control apparatus according to the invention.
Figure 5A:
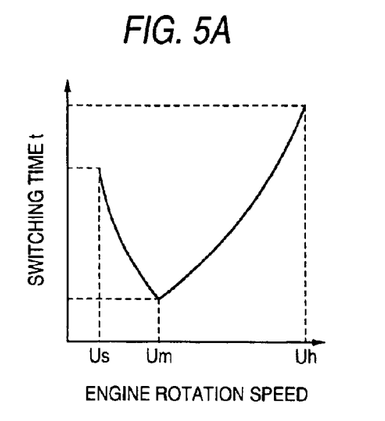
FIG. 5A is a diagram for explaining the relation between the engine rotation speed and a switching time of an electric lever.
Figure 5B:
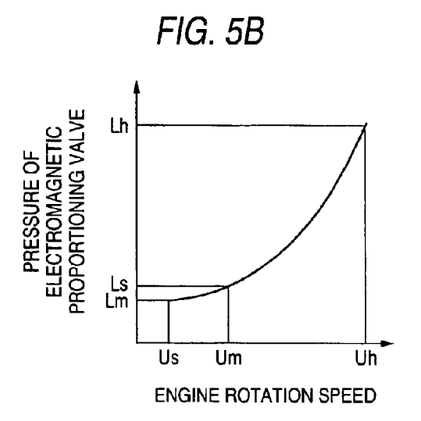
FIG. 5B is a diagram for explaining the relation between the engine rotation speed and the output of the electromagnetic proportioning valve.
Figure 6:
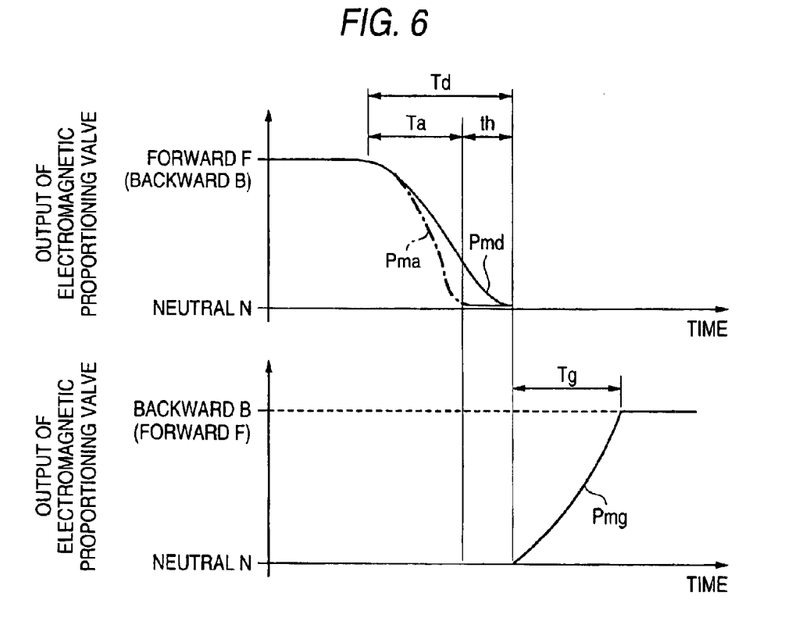
FIG. 6 is a diagram showing other examples of the modulate signal to be outputted from the control unit to the electromagnetic proportioning valve.
Figure 7:
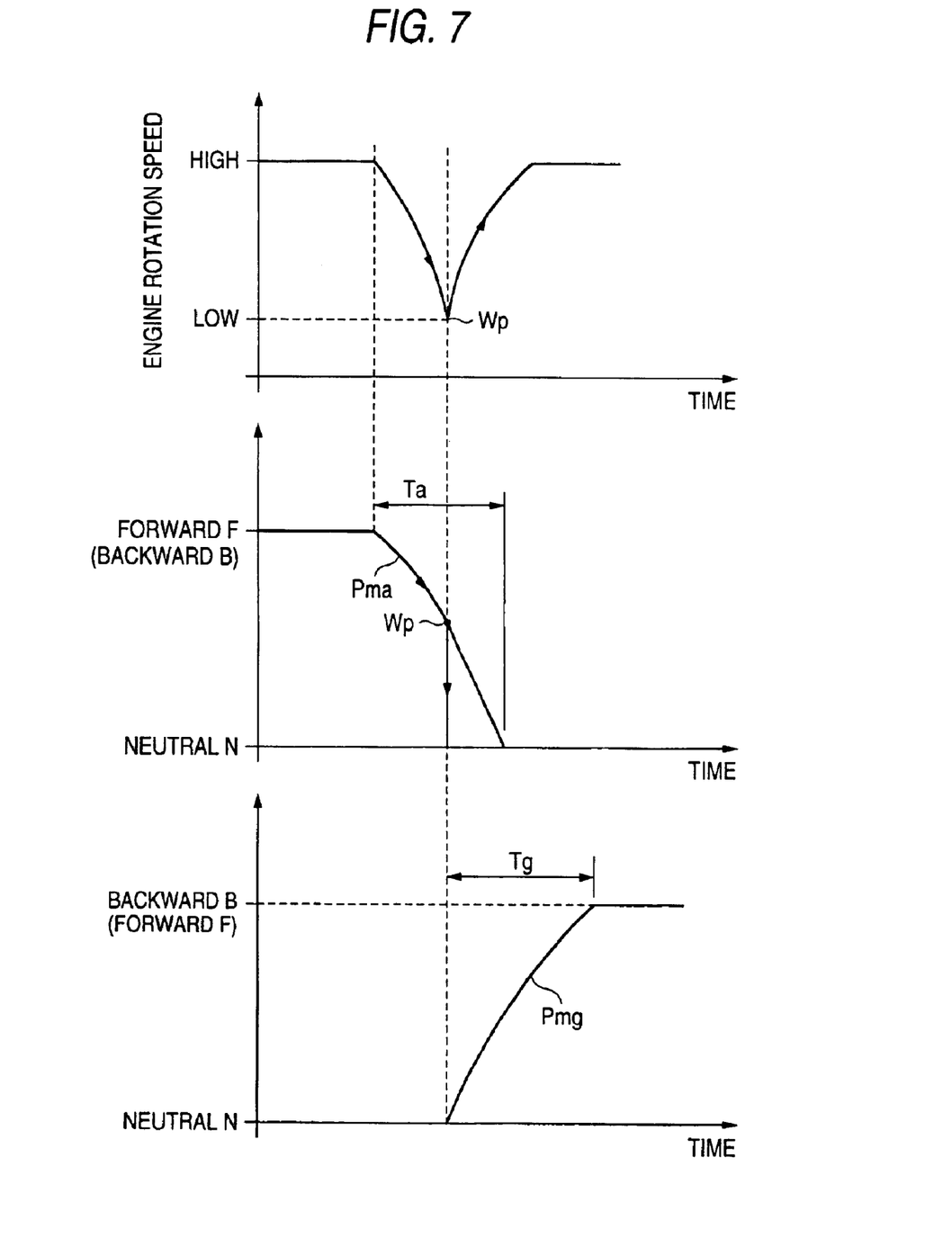
FIG. 7 is a diagram for explaining relations between the engine rotation speed and the modulate signals to be outputted from the control unit to the electromagnetic proportioning valve.
Figure 8:
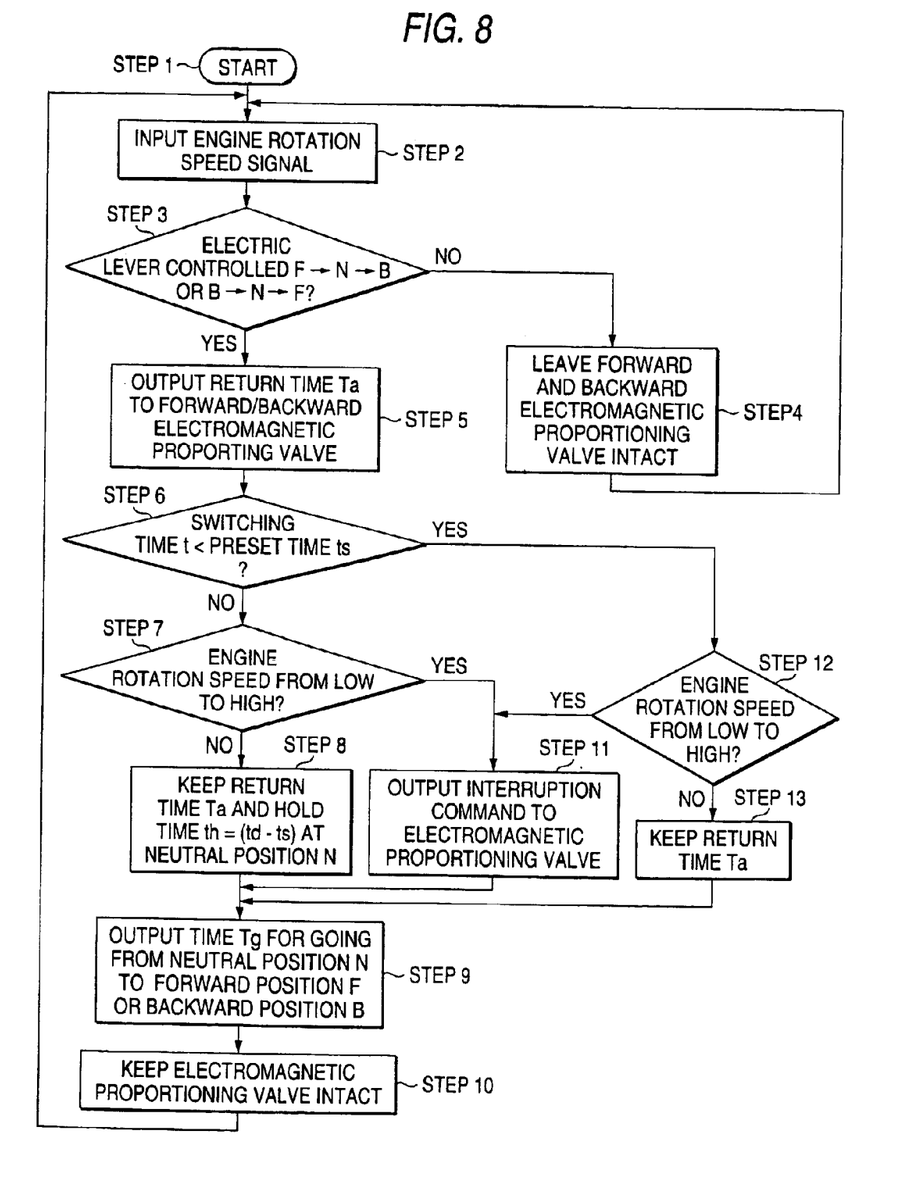
FIG. 8 is a flow chart of a forward/backward switching control method of the hydraulic drive vehicle according to the invention.

First of all, the forward/backward switching control apparatus for the hydraulic drive vehicle of the embodiment will be described with reference to FIG. 1 to FIG. 8. FIG. 1 is a circuit diagram of a forward/backward switching control apparatus for a hydraulic drive vehicle; FIG. 2 is a diagram showing one example of a forward/backward switching time and a modulate signal to be outputted from a control unit to an electromagnetic proportioning valve; FIG. 3A to FIG. 3C are diagrams showing other examples of the modulate signal to be outputted from the control unit to the electromagnetic proportioning valve; FIG. 4 is a block diagram of a forward/backward switching control apparatus; FIG. 5A and FIG. 5B are diagrams for explaining the relation between the engine rotation speed and a switching time of an electric lever and the relation between the engine rotation speed and the output of the electromagnetic proportioning valve; FIG. 6 is a diagram showing other examples of the modulate signal to be outputted from the control unit to the electromagnetic proportioning valve; FIG. 7 is a diagram for explaining relations between the engine rotation speed and the modulate signals to be outputted from the control unit to the electromagnetic proportioning valve; and FIG. 8 is a flow chart of a forward/backward switching control method of the hydraulic drive vehicle.

In FIG. 1, a hydraulic drive device 2 constructs a closed circuit such that a two-way variable displacement hydraulic pump 4 (as will be called the "variable pump 4") driven by an engine 3 is connected via conduits 6 and 7 to a variable displacement hydraulic motor 5 (as will be called the "variable motor 5").

The variable pump 4 is connected to a pump inclination angle control mechanism 9, and its swash plate is inclined in two forward and backward directions by the pump inclination angle control mechanism 9 to discharge the pressure oil to the conduit 6 for the forward run and to the conduit 7 for the backward run, for example. In the following example, the conduits 6 and 7 will be called the forward conduit 6 and the backward conduit 7, and the components will be discriminated by adding letters f and b to them for the forward and backward runs, respectively.

A forward/backward switching control apparatus 1 for the hydraulic drive vehicle is constructed to include the electromagnetic pump inclination angle control mechanism 9, a control unit 12, electric operating means (as will be called the "electric lever 20"), and an engine rotation speed sensor 21.

The electromagnetic pump inclination angle control mechanism 9 (as will be called the "pump inclination angle control mechanism 9") is formed of a pump inclination angle cylinder 10 (as will be called the "pump cylinder 10") and a pump forward/backward switching valve 11. This pump forward/backward switching valve 11 is equipped with a forward electromagnetic proportioning valve 11f and a backward electromagnetic proportioning valve 11b.

The forward electromagnetic proportioning valve 11f and the backward electromagnetic proportioning valve 11b are connected via a pilot conduit 14 to a fixed displacement pump 13 (as will be called the "fixed pump 13") driven by the engine 3.

The fixed pump 13 feeds pressure oils for the pilot pressure and for the charge pressure to the corresponding portions. The forward electromagnetic proportioning valve 11f feeds the pilot pressure via a cylinder conduit 15f to a forward pressure chamber 10f of the pump cylinder 10, and the backward electromagnetic proportioning valve 11b feeds the pilot pressure via a cylinder conduit 15b to a backward pressure chamber 10b of the pump cylinder 10, such that their not-shown swash plates are inclined forward or backward. As a result, the swash plate of the variable pump 4 is inclined in both the forward and backward directions by the pump inclination angle control mechanism 9 thereby to discharge the pressure oil to the forward conduit 6 or the backward conduit 7.

The forward electromagnetic proportioning valve 11$f$ and the backward electromagnetic proportioning valve 11$b$ are connected to the control unit 12 so that they are switched individually in response to a forward command or a backward command from the control unit 12 to reduce the pilot pressure from the fixed pump 13 and feed it to the pump cylinder 10.

The control unit 12 is connected with the forward electromagnetic proportioning valve 11$f$, the backward electromagnetic proportioning valve 11$b$, the electric lever 20, the engine rotation speed sensor 21 and a motor electromagnetic proportioning valve 31. In response to the forward signal or the backward signal of the electric lever 20, the control unit 12 outputs a forward control signal Pf to the forward electromagnetic proportioning valve 11$f$, if it receives the forward signal, and a backward control signal Pb to the backward electromagnetic proportioning valve 11$b$ if it receives the backward signal.

When the electric lever 20 is switched either from a forward position F via a neutral position N to a backward position B or from the backward position B via the neutral position N to the forward position F, moreover, the control unit 12 outputs a forward/backward control signal Pq to the forward electromagnetic proportioning valve 11$f$ or the backward electromagnetic proportioning valve 11$b$.

This forward/backward control signal Pq is so outputted as a first modulate signal Pma from the control unit 12 to the forward electromagnetic proportioning valve 11$f$ or the backward electromagnetic proportioning valve 11$b$ that a return time Ta to return from the forward position F to the neutral position N and from the backward position B to the neutral position N, as shown in FIG. 2, may be delayed when the switching time (t) is not longer than a predetermined time (ts). In accordance with the first modulate signal Pma, the forward electromagnetic proportioning valve 11$f$ and the backward electromagnetic proportioning valve 11$b$ reduce the pilot pressure from the fixed pump 13 and output it to the pump cylinder 10.

This first modulate signal Pma can be exemplified by any of a first-order delay type, as shown in FIG. 3A, a linear output type of FIG. 3B and a second-order interpolation type (or an S-shaped type). On the other hand, the first modulate signal Pma can also be set, as indicated by a double-dotted line, according to the switching time and the engine rotation speed.

When the electric lever 20 is switched from the forward position F to the backward position B, as shown in FIG. 2, for example, the control unit 12 judges the switching time t of the forward/backward control signal Pq and outputs the first modulate signal Pma to the forward electromagnetic proportioning valve 11$f$ when the switching time t is not longer than the predetermined time (ts). According to the first modulate signal Pma, the forward electromagnetic proportioning valve 11$f$ reduces the pilot pressure from the fixed pump 13 gradually, while returning it to a tank 16, and feeds the reduced pilot pressure to the pump cylinder 10.

The pump cylinder 10 returns a piston 10$c$ to the neutral position, while receiving the pressure oil gradually reduced, according to the spring force of a spring 17 and reduces the inclination angle of the swash plate thereby to reduce the discharge displacement qv of the variable pump 4. Accordingly, the hydraulic drive vehicle is gradually decelerated to stop in accordance with the first modulate signal Pma from the control unit 12. The pump cylinder 10 strokes by receiving the gradually reduced pressure oil at the forward pressure chamber 10$f$ and the spring force of the spring 17 at the backward pressure chamber 10$b$, so that it does not vibrate, and the variable pump 4 can discharge the pressure oil stably.

Next, when the shift is switched from the neutral position N to the backward position B, too, the control unit 12 outputs a second modulate signal Pmg of a going time Tg to the backward electromagnetic proportioning valve 11$b$, as shown in FIG. 2. In accordance with the second modulate signal Pmg, the backward electromagnetic proportioning valve 11$b$ feeds the pilot pressure from the fixed pump 13, while gradually increasing it, to the pump cylinder 10.

This pump cylinder 10 strokes against the spring 17 to rock the inclination angle of the swash plate thereby to increase the discharge displacement qv of the variable pump 4. Accordingly, the hydraulic drive vehicle is accelerated for the going time Tg in accordance with the second modulate signal Pmg from the control unit 12. This control is similar to that of the switching case from backward to forward.

This control unit 12 is formed of a controller but may be formed of a CPU or computer as the control means.

The fixed pump 13 outputs the pilot pressure, as set to the predetermined pressure, to the forward electromagnetic proportioning valve 11$f$, the backward electromagnetic proportioning valve 11$b$ and the motor electromagnetic proportioning valve 31. The fixed pump 13 is connected to the forward conduit 6 via a charge conduit 18$f$ and to the backward conduit 7 via a charge conduit 18$b$ to feed the charge pressure thereby to prevent the occurrence of cavitation. Safety check valves 19$f$ and 19$b$ are arranged in the charge conduits 18$f$ and 18$b$, respectively.

The electric lever 20 outputs the forward signal, when controlled from the neutral position N to the forward position F, the backward signal, when controlled from the neutral position N to the backward position B, and the forward/backward signal, when controlled either from the forward position F to the backward position B or from the backward position B to the forward position F, as the electric signals to the control unit 12. The electric control means 20 may be exemplified by an electric control lever or a control switch.

The engine rotation speed sensor 21 is attached to the engine 3 so that it detects the rotation speed of the engine 3 and outputs an engine rotation speed signal Ev to the control unit 12.

The variable motor 5 is equipped with a motor inclination angle control mechanism 22 so that its swashplate can be inclined by the motor inclination angle control mechanism 22 to make the displacement qv (cc/rev) of the variable motor 5 variable.

The motor inclination angle control mechanism 22 is formed of a motor inclination angle cylinder 24 (as will be called the "motor cylinder 24"), a motor servo valve 25 and the motor electromagnetic proportioning valve 31. The motor inclination angle control mechanism 22 inclines the swash plate to the maximum inclination angle $\Theta$max to cause the maximum displacement qvmax, when the motor servo valve 25 is activated by a control pressure Pp of the motor electromagnetic proportioning valve 31 to contract the motor cylinder 24, and inclines the swash plate to the minimum inclination angle $\Theta$min to cause the minimum displacement qvmin, when the motor servo valve 25 extends the motor cylinder 24.

The motor cylinder 24 has a bottom chamber 24$a$ connected to the motor servo valve 25 and a rod chamber 24$b$ connected to the forward conduit 6 and the backward conduit 7 through a forward/backward shuttle valve 27. The motor cylinder 24 is extended due to the area difference, when it receives the pressure oil in the bottom chamber 24a and the rod chamber 24b, to rock the swash plate toward the minimum inclination angle Θmin thereby to reduce the displacement qv.

When the bottom chamber 24a is connected to the tank 16 through the motor servo valve 25, on the other hand, the motor cylinder 24 contracts to the maximum to rock the swash plate to the maximum inclination angle Θmax thereby to cause the maximum displacement qvmax.

The motor cylinder 24 has a cylinder rod 24c connected to the motor servo valve 25 through a spring 30. The cylinder rod 24c moves, as it moves, the not-shown spool of the motor servo valve 25 through the spring 30, and stop, when the pressure of the bottom chamber 24a and the force by the head chamber 24b to act on the cylinder rod 24c balance, to block the feed of the pressure oil through the motor servo valve 25.

As a result, the motor cylinder 24 is held at the position, where the cylinder rod 24c balances, to place the inclination angle of the swash plate constant, to keep the variable motor 5 rotating at a predetermined rotation speed.

The motor servo valve 25 is connected on its one side to the forward conduit 6, the backward conduit 7 and the tank 16 through the forward/backward shuttle valve 27 so that it receives, when active, the higher pressure oil from the forward conduit 6 and the backward conduit 7.

The other side of the motor servo valve 25 is connected to the bottom chamber 24a of the motor cylinder 24 so that it feeds the bottom chamber 24a with the pressure oil from the forward/backward shuttle valve 27 to extend the motor cylinder 24.

The motor servo valve 25 receives at its one end portion the spring 30 and the pressure oil to be fed as the pilot pressure to the bottom chamber 24a, and is connected at its other end portion to the fixed pump 13 through the motor electromagnetic proportioning valve 31, the forward/backward shuttle valve 27 and the pump forward/backward switching valve 11 so that it receives the reduced pressure oil as the pilot pressure.

The motor servo valve 25 is activated by the control pressure Pp of the motor electromagnetic proportioning valve 31 so that it is switched to an M-position, when it receives the high control pressure Pp, to feed the pressure oil of the forward conduit 6 or the backward conduit 7 to the bottom chamber 24a through the forward/backward shuttle valve 27 thereby to extend the cylinder rod 24c. The cylinder rod 24c stops, as it extends, at the aforementioned balanced position, and blocks the feed of the pressure oil from the motor servo valve 25 to the bottom chamber 24a.

The forward/backward shuttle valve 27 is connected on its one side to the forward conduit 6, the backward conduit 7, a forward branch conduit 33f from the cylinder conduit 15f, and a backward branch conduit 33b from the cylinder conduit 15b. The forward/backward shuttle valve 27 is connected on the other side to the head chamber 24b of the motor cylinder 24 and through the motor electromagnetic proportioning valve 31 to the motor servo valve 25.

The forward/backward shuttle valve 27 is switched to the Nf position, when it receives the pressure oil from the forward branch conduit 33f at its one end portion, and feeds the control pressure Pp to the motor servo valve 25 from a forward port 13f through the motor electromagnetic proportioning valve 31 thereby to switch the motor servo valve 25.

Moreover, the forward/backward shuttle valve 27 feeds the pressure oil of the forward conduit 6 to the head chamber 24b and through the motor servo valve 25 to the bottom chamber 24a thereby to extend the motor cylinder 24 by the area difference.

Likewise, the forward/backward shuttle valve 27 is switched to the Nb position, when it receives the pressure oil from the backward branch conduit 33b at its other end portion, to feed the control pressure Pp to the motor servo valve 25 from a backward port 13b through the motor electromagnetic proportioning valve 31 thereby to switch the motor servo valve 25.

Moreover, the forward/backward shuttle valve 27 feeds the pressure oil of the backward conduit 7 to the head chamber 24b and through the motor servo valve 25 to the bottom chamber 24a thereby to extend the motor cylinder 24 by the area difference.

The motor electromagnetic proportioning valve 31 is connected on its one side to the forward/backward shuttle valve 27 and on its other side to the motor servo valve 25 and the tank 16. The motor electromagnetic proportioning valve 31 acts in response to a control signal P from the control unit 12, and reduces the pilot pressure Pmax of the fixed pump 13 through the forward/backward shuttle valve 27 and feeds it as the control pressure Pp to the motor servo valve 25.

The motor electromagnetic proportioning valve 31 feeds and switches the motor servo valve 25 with the control pressure Pp and feeds the pressure oil of the forward conduit 6 or the backward conduit 7 to the bottom chamber 24a from the forward/backward shuttle valve 27 to the motor servo valve 25 thereby to extend the motor cylinder 24. As a result, the motor servo valve 25 is activated by the control pressure Pp fed from the motor electromagnetic proportioning valve 31 in accordance with the control signal P of the control unit 12, to control the rotation speed of the variable motor 5.

The control unit 12 is connected with the motor electromagnetic proportioning valve 31. In response to a signal according to the control of a potentiometer 34, the control unit 12 outputs the control signal P to the motor electromagnetic proportioning valve 31 thereby to control the displacement of the variable motor 5 in accordance with the control.

FIG. 4 is a block diagram of the forward/backward switching control apparatus 1 of the hydraulic drive vehicle thus constructed. In FIG. 4, the engine rotation speed signal Ev is transmitted to the control unit 12 from the engine rotation speed sensor 21 attached to the engine 3. Moreover, control signals according to the forward, backward and forward/backward operations are also transmitted from the electric lever 20 to the control unit 12.

In accordance with the operation of the electric lever 20, the control unit 12 outputs any of the forward control signal Pf, the backward control signal Pb and the forward/backward control signal Pq to the forward electromagnetic proportioning valve 11f or the backward electromagnetic proportioning valve 11b of the pump inclination angle control mechanism 9.

In response to the command of the control signal P (or the modulate signal Pm), the forward electromagnetic proportioning valve 11f and the backward electromagnetic proportioning valve 11b reduce the pilot pressure of the fixed pump 13 and feeds it to the pump cylinder 10 thereby to stroke the pump cylinder 10. In accordance with the control direction, the pump cylinder 10 rocks the swash plate to discharge the pressure oil from the variable pump 4 to the forward conduit 6 or the backward conduit 7.

In response to the signal according to the operation of the potentiometer 34, on the other hand, the control unit 12 outputs the control signal P to the motor electromagnetic proportioning valve 31, to control the motor inclination angle control mechanism 22 of the variable motor 5 to a displacement according to the control thereby to run the hydraulic drive vehicle.

When the running direction of the hydraulic drive vehicle is to be changed, for example, the electric lever 20 is controlled to output its change signal to the control unit 12. In response to this change signal, the control unit 12 judges and outputs the forward/backward control signal Pq to the forward electromagnetic proportioning valve 11f or the backward electromagnetic proportioning valve 11b thereby to switch the running direction of the hydraulic drive vehicle from forward to backward or from backward to forward.

When the time t to switch the electric lever 20 is then not longer than the predetermined time (ts) and when the rotation speed of the engine 3 is held as it is or fluctuates from high to low rotations, the forward/backward control signal Pq is outputted as the first modulate signal Pma, the time Ta of which for returning from the forward position F to the neutral position N and from the backward position B to the neutral position N is shown in FIG. 2, from the control unit 12 to either the forward electromagnetic proportioning valve 11f or the backward electromagnetic proportioning valve 11b.

As the time Tg for goring from the neutral position N to the backward position B and from the neutral position N to the forward position F, moreover, the second modulate signal Pmg is outputted like before from the control unit 12 to the backward electromagnetic proportioning valve 11b or the forward electromagnetic proportioning valve 11f.

Thus, the deceleration and the acceleration are controlled with the modulate signal P of the control signal outputted from the control unit 12. Therefore, a switching portion Vc, as shown in FIG. 2, for the deceleration and acceleration is enabled to switch the forward and backward directions without any shock by selecting the first modulate signal Pma and the second modulate signal Pmg suitably.

FIG. 5A is a diagram for explaining the relation between the engine rotation speed and the switching time t of the electric lever 20, and FIG. 5B is a diagram for explaining the relation between the engine rotation speed and the output of the electromagnetic proportioning valve. As shown in FIG. 5B, the pressure MPa (corresponding to the returning time Ta) of the forward electromagnetic proportioning valve 11f and the backward electromagnetic proportioning valve 11b is changed with the rotation speed of the engine 3 at the forward/backward operating time. When the rotation speed of the engine 3 is medium at a predetermined rotation speed Um, the pressure MPa at a medium value Lm is outputted as the first modulate signal Pma to lower the pilot pressure outputted by the forward electromagnetic proportioning valve 11f thereby to shorten the return time Ta.

At a low rotation speed Us of the engine 3, the first modulate signal Pma is outputted from a low value Ls to lower the pilot pressure outputted by the forward electromagnetic proportioning valve 11f thereby to make the return time Ta slightly shorter than the maximum.

At a high rotation speed Uh of the engine 3, the first modulate signal Pma is outputted from a high value Lh to raise the pilot pressure outputted by the forward electromagnetic proportioning valve 11f thereby to elongate the return time Ta.

The switching time t of the electric lever 20 is set at a low value when the rotation speed of the engine 3 is at the medium predetermined value Um, as shown in FIG. 5A, so that the return time Ta of the forward electromagnetic proportioning valve 11f is short. At the low rotation speed Us and at the high rotation speed Uh of the engine 3, the switching time t of the electric lever 20 is set long so that the return time Ta of the forward electromagnetic proportioning valve 11f is long.

At the engine rotation speed not higher than the predetermined value Um, as described above, a third modulate signal Pmc is outputted, as indicated by a double dotted line, so that the longer return time Ta is outputted for the lower engine rotation speed. As a result, no cavitation occurs at the low engine rotation speed Us.

For this, a long return time Ta may be outputted in case the discharge displacement qv of the variable pump 4 is small.

When the time t for switching the electric lever 20 exceeds the predetermined time (ts), the control unit 12 outputs a fourth modulate signal Pmd shown in FIG. 6, as a time Td for returning from the forward position F to the neutral position N and from the backward position B to the neutral position N, to the forward electromagnetic proportioning valve 11f or the backward electromagnetic proportioning valve 11b.

Alternatively, the first modulate signal Pma of the return time Ta may be outputted, as indicated by a single-dotted line, to the forward electromagnetic proportioning valve 11f or the backward electromagnetic proportioning valve 11b, so that a holding time th may be retained at the neutral position N. For this holding time th, the difference (th=td−ts) between an actual switching time td and the predetermined time ts is held at the neutral position N. When the forward/backward switching operation is slowly conducted during the running time, therefore, the switch between the forward and backward runs is effected slowly according to the operation.

When the time t for the electric lever 20 to switch is not longer than the predetermined time (ts) and when the rotation speed of the engine 3 changes from low to high speeds, the forward/backward control signal Pq is interrupted at a point Wp midway of the first modulate signal Pma for returning from the forward position F to the neutral position N and from the backward position B to the neutral position N, as shown in FIG. 7, so that the output of the forward electromagnetic proportioning valve 11f or the backward electromagnetic proportioning valve 11b abruptly returns to the neutral position.

Simultaneously as this, for the time Tg for going from the neutral position N to the backward position B and from the neutral position N to the forward position F, the second modulate signal Pmg is outputted from the control unit 12 to the backward electromagnetic proportioning valve 11b or the forward electromagnetic proportioning valve 11f. This quickens the switching of the forward and backward runs.

Here will be described the forward/backward switching control method of the hydraulic drive vehicle.

The control method for changing the running direction while the hydraulic drive vehicle is running will be described with reference to the flow chart of FIG. 8. The following description is made on the case the running direction is changed from forward to backward, but a similar control is made for the change from backward to forward.

When the hydraulic drive vehicle runs forward at Step 1, the electric lever 20 is controlled to the forward position F so that the forward signal is outputted to the control unit 12. In response to the forward signal, the control unit 12 outputs the forward control signal Pf to the forward electromagnetic proportioning valve 11f to feed the pilot pressure to the pump cylinder 10. In accordance with the forward position F, the pump cylinder 10 rocks the swash plate to discharge the pressure oil from the variable pump 4 to the forward conduit 6 and feed it to the variable motor 5.

Moreover, the control unit 12 outputs the control signal P to the motor electromagnetic proportioning valve 31 so that the control pressure Pp according to the control is outputted to the motor servo valve 25. The motor servo valve 25 extends the motor cylinder 24 to incline the swash plate largely, for example, thereby to reduce the displacement qv of the variable motor 5 so that the hydraulic drive vehicle runs at a predetermined speed. When it is intended to change the running direction from this state, the electric lever 20 is operated forward/backward.

At Step 2, the rotation speed of the engine 3 is detected by the engine rotation speed sensor 21, and the engine rotation speed signal Ev is inputted to the control unit 12. This rotation speed is continuously detected.

At Step 3, the control unit 12 receives the control signal from the electric lever 20 and judges whether the electric lever 20 has been controlled forward or backward (F→N→B, or B→N→F, or not (NO).

In case the answer of Step 3 is (NO) that the electric lever 20 is not operated, the forward electromagnetic proportioning valve 11f keeps and outputs the pilot pressure intact at Step 4, and the routine returns to Step 2.

In case the answer of Step 3 is (YES) that the electric lever 20 is operated, the routine advances to Step 5.

At Step 5, the control unit 12 outputs the first modulate signal Pma as the time Ta for returning from the forward position F to the neutral position N, to the forward electromagnetic proportioning valve 11f.

At Step 6, the control unit 12 judges whether or not the forward/backward switching time t of the electric lever 20 is shorter than the preset time (ts).

If the answer of Step 6 is (NO) that the forward/backward switching time t exceeds the preset time (ts), the routine advances to Step 7.

At Step 7, the control unit 12 judges it from the engine rotation speed signal Ev whether or not the rotation speed of the engine 3 has changed from low to high.

In case the answer of Step 7 is (NO) that the rotation speed of the engine 3 is not changed from low to high, that is, in case the engine rotation speed is kept intact or changed from high to low, the routine advances to Step 8.

At Step 8, the control unit 12 continuously outputs the first modulate signal Pma as the time Ta for returning from the forward position F to the neutral position N, to the forward electromagnetic proportioning valve 11f. At this time, the forward electromagnetic proportioning valve 11f keeps the difference (th=td−ts) between the actual switching time td and the preset time ts as the hold time th at the neutral position N. Alternatively, the control unit 12 outputs the fourth modulate signal Pmd, as shown in FIG. 6.

At Step 9, the control unit 12 outputs the time Tg for going from the neutral position N to the backward position B, as the second modulate signal Pmg to the backward electromagnetic proportioning valve 11b. In accordance with the second modulate signal Pmg, the backward electromagnetic proportioning valve 11b feeds the pilot pressure from the fixed pump 13, while gradually raising it, to the pump cylinder 10 to rock the inclination angle of the swash plate thereby to increase the discharge displacement qv of the variable pump 4. Accordingly, the hydraulic drive vehicle is accelerated according to the second modulate signal Pmg from the control unit 12.

When the discharge displacement qv of the variable pump 4 rises to the set displacement, the backward electromagnetic proportioning valve 11b keeps its output continuously at Step 10, and the routine returns to Step 2.

As a result, the hydraulic drive vehicle is switched from forward to backward, and the forward/backward switching is delayed, so that the hydraulic drive vehicle is switched between forward and backward longer than the preset time according to the control of the operator.

In case the answer of Step 7 is (YES) that the rotation speed of the engine 3 is changed from low to high, the routine advances to Step 11.

At Step 11, the control unit 12 interrupts the firsts modulate signal Pma of the forward/backward control signal Pq at the point Wp midway of the time Ta for returning from the forward position F to the neutral position N. As a result, the output of the forward electromagnetic proportioning valve 11f abruptly returns to the neutral position, as shown in FIG. 7.

If the first modulate signal Pma is interrupted at the medium point Wp at Step 11, the routine advances to Step 9, at which the second modulate signal Pmg of the time Tg for going from the neutral position N to the backward position B is outputted like before from the control unit 12 to the backward electromagnetic proportioning valve 11b.

As a result, the hydraulic drive vehicle is switched from forward to backward, and this forward/backward switching is quickened so that the hydraulic drive vehicle is switched quickly from forward to backward according to the accelerating operation of the operator.

In case the answer of Step 6 is (YES) that the forward/backward switching time t is shorter than the preset time (ts), the routine advances to Step 12.

At Step 12, the control unit 12 judges it from the engine rotation speed signal Ev whether or not the rotation speed of the engine 3 has changed from low to high.

In case the answer of Step 12 is (NO) that the rotation speed of the engine 3 is not changed from low to high, that is, in case the engine rotation speed is kept intact or changed from high to low, the routine advances to Step 13.

At Step 13, the control unit 12 continuously outputs the first modulate signal Pma as the time Ta for returning from the forward position F to the neutral position N, to the forward electromagnetic proportioning valve 11f, and the routine advances to Step 9 when the outputting stops.

At Step 9, like before, the control unit 12 outputs the time Tg for going from the neutral position N to the backward position B, as the second modulate signal Pmg to the backward electromagnetic proportioning valve 11b, and the backward electromagnetic proportioning valve 11b feeds the pilot pressure from the fixed pump 13, while gradually raising it, to the pump cylinder 10 to rock the inclination angle of the swash plate thereby to increase the discharge displacement qv of the variable pump 4. Accordingly, the hydraulic drive vehicle is accelerated according to the second modulate signal Pmg from the control unit 12.

Thus, the forward/backward switching control method switches the forward and backward runs of the hydraulic drive vehicle in accordance with the control time of the electric lever 20 so that the forward/backward switching is made in the feeling according to the control of the operator.

Here in the embodiment thus far described, the variable pump 4 and variable motor 5 are connected by the closed circuit but may be connected by an open circuit. The hydraulic drive vehicle maybe exemplified by a tire type or crawler type running equipment. The control lever device may be exemplified by the electric lever 20 or the control switch so long as it detects the control position and generates the electric signals. The two electromagnetic proportioning valves are used for the forward and backward runs but may be assembled into one. The electromagnetic proportioning valves may be exemplified by electromagnetic servo valves.

What is claimed is:

1. A forward/backward switching control apparatus for a hydraulic drive vehicle, comprising:

a variable displacement type hydraulic pump driven by an engine for discharging pressure oil selectively in two directions;

an electromagnetic pump inclination angle control mechanism for making the discharge displacement of the variable displacement type hydraulic pump variable and for causing the same to discharge selectively in the two directions;

electric operating means for outputting signals to run the hydraulic drive vehicle forward or backward; and control means for measuring a switching time when the electric operating means is switched either from a forward position through a neutral position to a backward position or from the backward position through the neutral position to the forward position to output a forward signal or a backward signal; and when the switching time is not longer than a preset time, outputting a first modulate signal for delaying the return times from the forward position to the neutral position and from the backward position to the neutral position to the electromagnetic pump inclination angle control mechanism.

2. A forward/backward switching control apparatus for a hydraulic drive vehicle according to claim 1, further comprising control means for outputting the return time by the first modulate signal variably in accordance with an engine rotation speed.

3. A forward/backward switching control apparatus for a hydraulic drive vehicle according to claim 2, further comprising control means for outputting a second modulate signal to delay the time for going from the neutral position to the forward position or from the neutral position to the backward position, to the electromagnetic pump inclination angle control mechanism.

4. A forward/backward switching control apparatus for a hydraulic drive vehicle according to claim 3, further comprising control means for outputting a third modulate signal to delay longer for the lower engine rotation speed, when the engine rotation speed is not higher than a preset rotation speed.

5. A forward/backward switching control apparatus for a hydraulic drive vehicle according to claim 4, further comprising control means for interrupting the first modulate signal of the return time and outputting the second modulate signal of the going time, when the engine rotation speed changes from low to high.

6. A forward/backward switching control apparatus for a hydraulic drive vehicle according to claim 3, further comprising control means for interrupting the first modulate signal of the return time and outputting the second modulate signal of the going time, when the engine rotation speed changes from low to high.

7. A forward/backward switching control apparatus for a hydraulic drive vehicle according to claim 2, further comprising control means for outputting a third modulate signal to delay longer for the lower engine rotation speed, when the engine rotation speed is not higher than a preset rotation speed.

8. A forward/backward switching control apparatus for a hydraulic drive vehicle according to claim 2, further comprising control means for interrupting the first modulate signal of the return time and outputting the second modulate signal of the going time, when the engine rotation speed changes from low to high.

9. A forward/backward switching control apparatus for a hydraulic drive vehicle according to claim 1, further comprising control means for outputting a second modulate signal to delay the time for going from the neutral position to the forward position or from the neutral position to the backward position, to the electromagnetic pump inclination angle control mechanism.

10. A forward/backward switching control apparatus for a hydraulic drive vehicle according to claim 1, further comprising control means for outputting a third modulate signal to delay longer for the lower engine rotation speed, when the engine rotation speed is not higher than a preset rotation speed.

11. A forward/backward switching control apparatus for a hydraulic drive vehicle according to claim 1, further comprising control means for interrupting the first modulate signal of the return time and outputting the second modulate signal of the going time, when the engine rotation speed changes from low to high.

* * * * *